United States Patent
Gajda (10) Patent No.: US 9,684,621 B2
(45) Date of Patent: Jun. 20, 2017

(54) CAN BUS TERMINATION CONNECTOR (71) Applicant: Electro-Motive Diesel, Inc., LaGrange, IL (US)

(72) Inventor: Tadeusz A. Gajda, Homer Glen, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 259 days.

(21) Appl. No.: 14/678,399

(22) Filed: Apr. 3, 2015

(65) Prior Publication Data
US 2016/0294123 A1 Oct. 6, 2016

(51) Int. Cl.
*H01R 13/66* (2006.01)
*G06F 13/40* (2006.01)
*G06F 13/42* (2006.01)
*H01R 13/52* (2006.01)
*H01R 43/24* (2006.01)

(52) U.S. Cl.
CPC ...... *G06F 13/4081* (2013.01); *G06F 13/4282* (2013.01); *H01R 13/5202* (2013.01); *H01R 13/6616* (2013.01); *H01R 43/24* (2013.01)

(58) Field of Classification Search
CPC .. G06F 13/38; G06F 13/4004; G06F 13/4063; G06F 13/4688; G06F 13/4086
USPC ..... 439/620.04; 710/100, 300, 305; 338/220
See application file for complete search history.

(56) References Cited

U.S. PATENT DOCUMENTS

| 4,932,873 A | * | 6/1990 | La Shier | H01R 12/675 29/842 |
|---|---|---|---|---|
| 6,061,806 A | * | 5/2000 | Caldwell | G06F 13/4086 710/100 |
| 6,768,328 B2 | * | 7/2004 | Self | G01R 1/07307 324/72.5 |
| 9,397,418 B2 | * | 7/2016 | Kashiwakura | H04L 25/0298 |
| 2009/0292841 A1 | | 11/2009 | Phillips | |

FOREIGN PATENT DOCUMENTS

CN 201467155 U 5/2010

OTHER PUBLICATIONS

Vector Informatik GMBH; Accessories for Network Interfaces; Manual; 2014; Version 3.1; Germany.
(Continued)

*Primary Examiner* — Vanessa Girardi
(74) *Attorney, Agent, or Firm* — Miller, Matthias & Hull (57) ABSTRACT

A termination connector for use in a heavy machine environment operable to terminate an electronic signal of a communication network. The termination connector has a connector housing which can be mated with a separate receptacle to connect to the communication network. The termination connector has a plurality of pin receptacles within the connector housing which connect to a termination circuit. The termination circuit has at least two resistors in electric series with one another connected to a first pin receptacle of the plurality of pin receptacles and connected to a second pin receptacle of the plurality of pin receptacles. A capacitor is connected between the at least two resistors in electric series at a front capacitor end and the back capacitor end is connected to a third pin receptacle of the plurality of pin receptacles within the connector housing.

20 Claims, 7 Drawing Sheets

(56) References Cited

OTHER PUBLICATIONS

Texas Instruments Incorporated; Steve Corrigan; Controller Area Network Physical Layer Requirements; Application Report; Jan. 2008; Texas.
Texas Instruments Incorporated; Steve Monroe; Basics of Debugging the Controller Area Network (CAN) Physical Layer; Article; 2013; Texas.
Triangle Digital Support; Automotive CAN Bus; Drawing; 3-PIN J1939 Connector.

* cited by examiner

FIG.8

CAN BUS TERMINATION CONNECTOR

TECHNICAL FIELD

The present disclosure generally relates to controller area network (CAN) buses for engines, and more particularly relates to a termination circuit configuration of a CAN bus termination connector.

BACKGROUND

Controller Area Network (CAN) buses allow microcontrollers to communicate with one another without being attached to a main computer. The CAN buses communicate with one another with a message based protocol to send and receive information between the multiple devices connected to the network. Originally, CAN buses were developed for the automotive industry, but have expanded their use into many other industries including entertainment and sporting uses.

CAN buses are usually connected serially with one another using a two wire system. These two wires, usually twisted, allow the multiple CAN buses to communicate with one another. The CAN transceiver of each individual CAN bus is connected to this two line system. Because this two wire system effectively allows for data signals to flow between the multiple CAN buses, proper termination is needed at the ends of the two wires connecting the multiple buses.

Electrical termination is necessary for proper communication between the multiple CAN buses. At the end of the chain of CAN buses a terminator is needed to prevent the electrical data signals from being reflected back causing interference with latter electrical communication. Terminator circuits are placed at the ends of the transmission lines and designed to match the electrical impedance of the network so that there is minimal signal reflection.

Termination circuits have been developed in the past to terminate the signals flowing out of CAN buses. In United States Published Patent Application No. 2009/0292841 A1 a network is disclosed communicating on a Local Interconnected Network (LIN) protocol. A CAN bus as part of this network has an output connected to a termination circuit configuration before continuing on to a sensor. In such a configuration LIN provides a cost effective transmission network for simple sensor applications. However in complex engine environments connecting multiple electronic control units, a different communication protocol is needed. Additionally, in these complex engine environments proper housing for a termination circuit is desired to make sure the termination circuit does not malfunction.

Proper termination circuits are especially important when dealing with complex engine signals and operations like those used in automotive, trucking, and locomotive engine environments. Engine environments such as these usually use a high speed CAN transmission protocol so that the multiple components of these engines can be in quick and proper communication with one another. Therefore, providing a stable and effective termination circuit at the ends of these CAN networks is of extreme importance to both provide correct communication within the network and to minimize electrical signal reflection and noise within the CAN network during operation.

SUMMARY OF THE DISCLOSURE

In one aspect of the disclosure a termination connector for use in heavy machine engines is disclosed having a connector housing, a plurality of pin receptacles contained within the connector housing, and a termination circuit connected to the plurality of pin receptacles. The plurality of pin receptacles are configured to receive electronic signals from a communication module. The termination circuit connected to the plurality of pin receptacles has at least two resistors connected in electrical series. A front connection of the at least two resistors is connected to a first pin receptacle of the plurality of pin receptacles, and an end connection of the at least two resistors is connected to a second pin receptacle of the plurality of pin receptacles. A capacitor having a front capacitor end is connected between the at least two resistors and the back capacitor end is connected to a third pin receptacle of the plurality of pin receptacles.

In another aspect of the disclosure, a communication network for use in heavy machine engines is disclosed having a plurality of communication modules and a splitting component operable to connect the plurality of communication modules to one another. The plurality of communication modules are operable to send and receive electronic signals between one another. The splitting component has an input port and at least two output ports. A first communication module of the plurality of communication modules is connected to the input port of the splitting component and a second communication module of the plurality of communication modules is connected to a first output port of the at least two output ports of the splitting component. A termination connector is connected to a second output port of the at least two output ports of the splitting component and operable to terminate the electronic signal received by the termination connector. The termination connector has a connector housing, a plurality of pin receptacles contained within the connector housing, and a termination circuit connected to the plurality of pin receptacles. The plurality of pin receptacles is configured to receive electronic signals from a communication network. The termination circuit connected to the plurality of pin receptacles has at least two resistors connected in electrical series. A front connection of the at least two resistors is connected to a first pin receptacle of the plurality of pin receptacles, and an end connection of the at least two resistors is connected to a second pin receptacle of the plurality of pin receptacles. A capacitor having a front capacitor end is connected between the at least two resistors and the back capacitor end is connected to a third pin receptacle of the plurality of pin receptacles.

In yet another aspect of the disclosure, a method of manufacturing a termination connector for use in heavy machine engines is disclosed. The method has the steps of forming a connector housing from a plastic material, placing a plurality of pin receptacles within the connector housing, and connecting a termination circuit inside the connector housing to the plurality of pin receptacles. The plurality of pin receptacles are configured to receive electronic signals from a communication module. The termination circuit connected to the plurality of pin receptacles has at least two resistors connected in electrical series. A front connection of the at least two resistors is connected to a first pin receptacle of the plurality of pin receptacles, and an end connection of the at least two resistors is connected to a second pin receptacle of the plurality of pin receptacles. A capacitor having a front capacitor end is connected between the at least two resistors and the back capacitor end is connected to a third pin receptacle of the plurality of pin receptacles.

These and other aspects and features of the present disclosure will be more readily understood when reading the following detailed description taken in conjunction with the accompanied drawings.

It should be understood that the drawings are not necessarily to scale and that the disclosed embodiments are illustrated diagrammatically and in partial views. It should be further understood that this disclosure is not to be limited to the particular embodiments illustrated herein.

DETAILED DESCRIPTION OF THE PREFERRED EMBODIMENTS

Proper communication between multiple CAN buses is needed for CAN communication networks to function correctly. While CAN communication networks can be properly wired, the ends of the CAN communication network must still be properly terminated to avoid signal reflection back into the CAN communication network. As discussed above, the following embodiment of the present disclosure seeks to provide proper termination of high speed CAN communication networks used in the engine environment of heavy machine equipment and vehicles.

CAN buses forming the CAN communication network of the present disclosure are used in a heavy machine engine environment. As used herein, the term "heavy machine engine" refers to engines of equipment or machinery used in transportation or commercial industry services. A heavy machine engine may be an engine used in automotive vehicles, trucking vehicles, tractors, rail vehicles and locomotives, earth moving machines, mining equipment, or construction equipment and the like.

Figure 1:
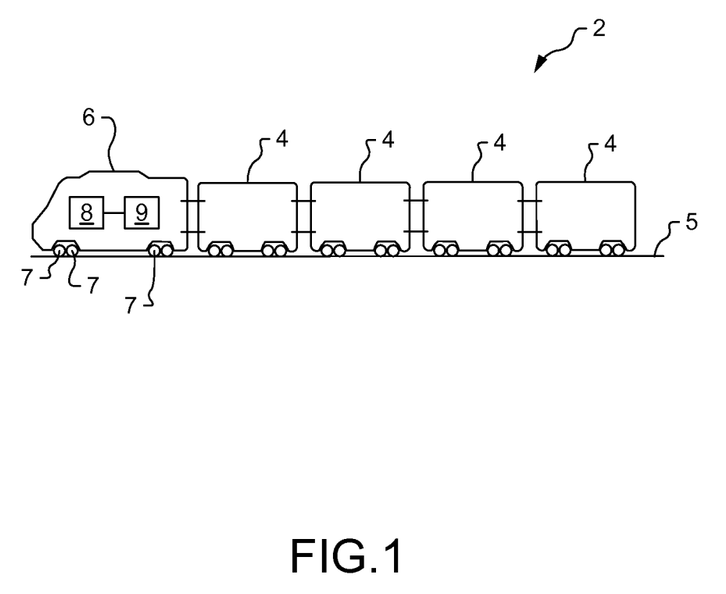
FIG. 1 is a diagrammatic view of vehicle, in accordance with one embodiment of the present disclosure.

FIG. 1 illustrates a vehicle 2 consistent with an embodiment of the present disclosure. Although vehicle 2 is illustrated as a rail transport vehicle, the vehicle 20 may be any type of vehicle or machine used to perform a driven operation involving physical movement associated with a particular industry, such as, without limitation, transportation, mining, construction, landscaping, forestry, agriculture, etc.

Non-limiting examples of vehicles and machines, for both commercial and industrial purposes, include trains, diesel-electric locomotives, diesel mechanical locomotives, mining vehicles, on-highway vehicles, earth-moving vehicles, loaders, excavators, dozers, motor graders, tractors, trucks, backhoes, agricultural equipment, material handling equipment, marine vessels, and other types that operate in a work environment. It is to be understood that the vehicle 2 is shown primarily for illustrative purposes to assist in disclosing features of various embodiments, and that FIG. 1 does not depict all of the components of a vehicle.

The vehicle 2 may include a locomotive 6 coupled to at least one railcar 4. The vehicle 2 may travel along a route 5, such as, one or more rails of a track. Railcars 4 may be passenger cars or freight cars for carrying passengers, goods, or other loads. The locomotive and railcars may travel along the route 5 with the use of wheels 7. The locomotive 6 may include an engine 8, or other power source, and a power system 9. The engine 8 may be electric, diesel, steam, hydrogen, gas turbine powered, hybrid, or of any other type for generating energy to propel the vehicle 2. Power system 9 may be configured to distribute electrical power to propulsion and non-propulsion electric loads. A CAN communication network may be employed within the locomotive 6 to communicate between the engine 8 and the power system 9. Individual CAN buses would be connected to the internal components of both the engine 8 and the power system 9. The individual CAN buses could be connected to a CAN communication network in which data, such as the revolutions per minute of the engine 8, can be communicated across CAN communication network so that the different engine 8 and power system 9 components attached to the CAN communication network can use this information to adjust and preform the correct operations needed for the locomotive 6 to function.

Figure 2:
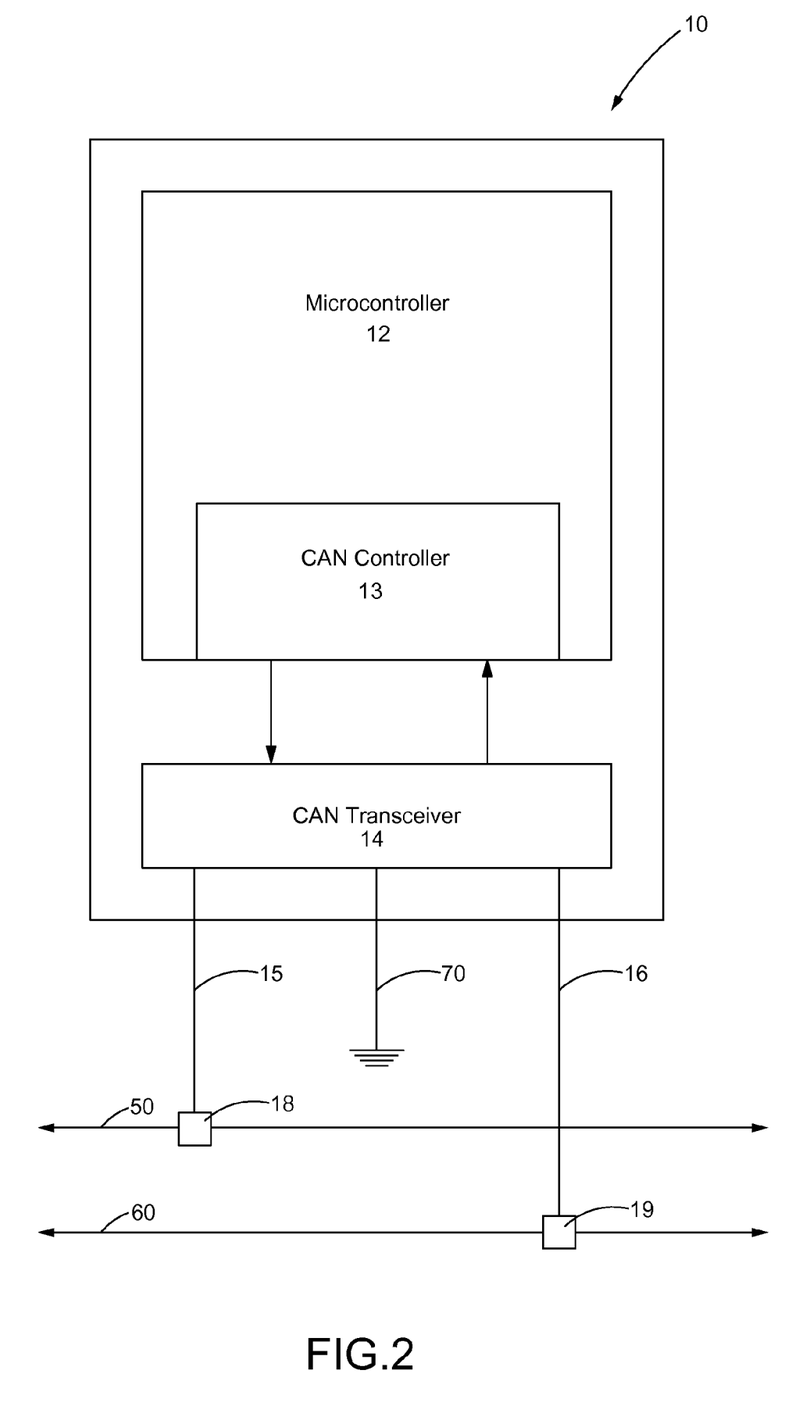
FIG. 2 is a schematic view of a CAN bus commonly used in CAN communication networks.

FIG. 2 illustrates the components of an individual controller area network (CAN) bus 10. The CAN bus 10 has a microcontroller 12. Part of the controller system of the microcontroller 12 is the CAN controller 13. The microcontroller 12 and CAN controller 13 are governed by ISO 11898-1 data link layer specifications. The CAN controller 13 is in communication with the CAN transceiver 14. In an embodiment of the present disclosure, the CAN transceiver 14 is implemented to the specifications of ISO 11898-2 as the physical layer of a high speed CAN bus 10. Two wires 15 and 16 leave the CAN transceiver 14 and connect to their respective transmission lines 50 and 60. A third optional connection to the CAN transceiver 14 can lead to a ground 70. The wires 15 and 16 which leave the CAN transceiver 14 and the transmission lines 50 and 60 make up the physical layer of the high speed CAN bus 10. One of the transmission lines 50 connects to the CAN_H input/output port 18 of the CAN transceiver 14 and carries the CAN_H signal. The other transmission line 60 connects to the CAN_L input/output port 19 of the CAN transceiver 14 and carries the CAN_L signal. The voltage drop from CAN_H line 50 and CAN_L line 60 determines the state of the data (O or 1) being transferred between the multiple CAN buses 10 connected to the transmission lines 50 and 60.

Figure 3:
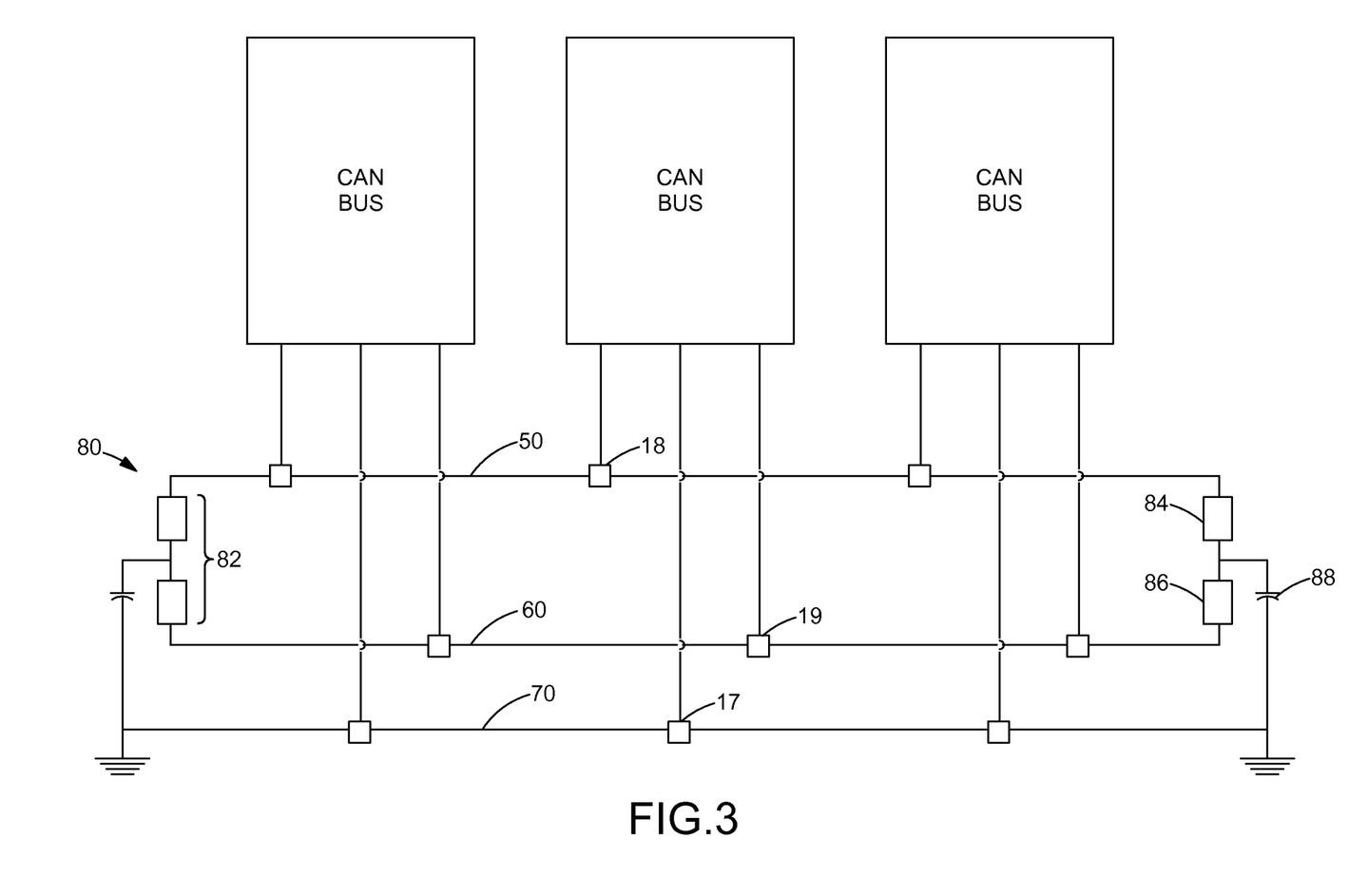
FIG. 3 is a schematic view of a CAN communication network with multiple CAN buses connected together by signal transmission lines, and the signal transmission lines terminated by a termination circuit at the ends of the transmission lines.

FIG. 3, as illustrated, shows multiple CAN buses 10 as part of a high speed CAN communication network 20. Each of the CAN buses 10 has input/output ports 18 and 19 connected to a transmission line 50 and 60. All three CAN buses 10 have their CAN_H input/output ports 18 connected to the common CAN_H transmission line 50. Additionally, all three CAN buses 10 have their CAN_L input/output ports 19 connected to the common CAN_L transmission line 60.

An optional ground line 70 can connect the CAN buses 10 through an input/output port 17. In an embodiment of the present disclosure, the entire CAN communication network 20 communicates with one another using the SAE J1939 protocol. SAE J1939 is a high level communications protocol that operates on CAN buses 10. SAE J1939 communication protocol specifies how information is exchanged between the CAN buses 10 of the CAN communication network 20. To operate the physical layer of SAE J1939, data must be transmitted at a speed of at least 250 kbps between the units via the transmission lines 50 and 60 with higher speeds being currently developed in the industry. In an embodiment of the present disclosure, SAE J1939-11 is the preferred communication protocol. SAE J1939-11 communicates via a shielded pair of twisted transmission wires 50 and 60. Additionally, SAE J1939-11 uses a three pin connection configuration 18, 19 and 17 and allows up to thirty CAN buses 10 to be connected to the transmission lines 50 and 60 of the CAN communication network 20.

Still referring to FIG. 3, an illustrated termination circuit 80 is located at the ends of the CAN communication network 20. The termination circuits 80 are necessary so that the electronic signals transmitted across the transmissions lines 50 and 60 will not be reflected back into the CAN communication network 20 when the electronic signals reach the ends of the transmission lines 50 and 60. This reflection of the electronic signals would cause interference in the CAN communication network 20 slowing the necessary flow of information between the CAN buses 10 connected to the CAN communication network 20. To stop this reflection of the electronic signals, a terminator 82 is placed at the ends of the CAN communication network 20 between the CAN_H transmission line 50 and the CAN_L transmission line 60. The terminator 82 used must match the impedance on the CAN network communication 20 for proper termination to occur.

Typically, in a high speed CAN communication network 20, a single resistor such as but not limited to a 120 ohm resistor is used as a terminator 82. However, in an embodiment of the present disclosure, two resistors 84 and 86 and a capacitor 88 make up a termination circuit 80 which is used to terminate the electronic signals. Two resistors 84 and 86 are placed in electric series with one another. The two resistors 84 and 86 connect the CAN_H transmission line 50 and to the CAN_L transmission line 60 respectively. Connected between the two resistors 84 and 86 is a capacitor 88. While one end of the capacitor 88 is connected between the two resistors 84 and 86, the other end of the capacitor 88 is connected to a ground 70. Preparing a termination circuit 80 in a configuration such as this has added benefit in a high speed CAN communication network 20. Using a typical termination circuit 80 of single resistor is not sufficient to effectively clear out the electronic signal reflections thereby causing addition noise or feedback within the CAN communication network 20. Implementing a termination circuit 80 with an additional capacitor 88 connect between two resistors 84 and 86, allows for a cleaner filtration of the electronic signals providing minimal reflection back into the CAN communication network 20. Therefore, electronic signal transmission along the transmission lines 50 and 60 will be cleaner and face less feedback or noise from reflected electronic signals within the CAN communication network 20.

Figure 4:
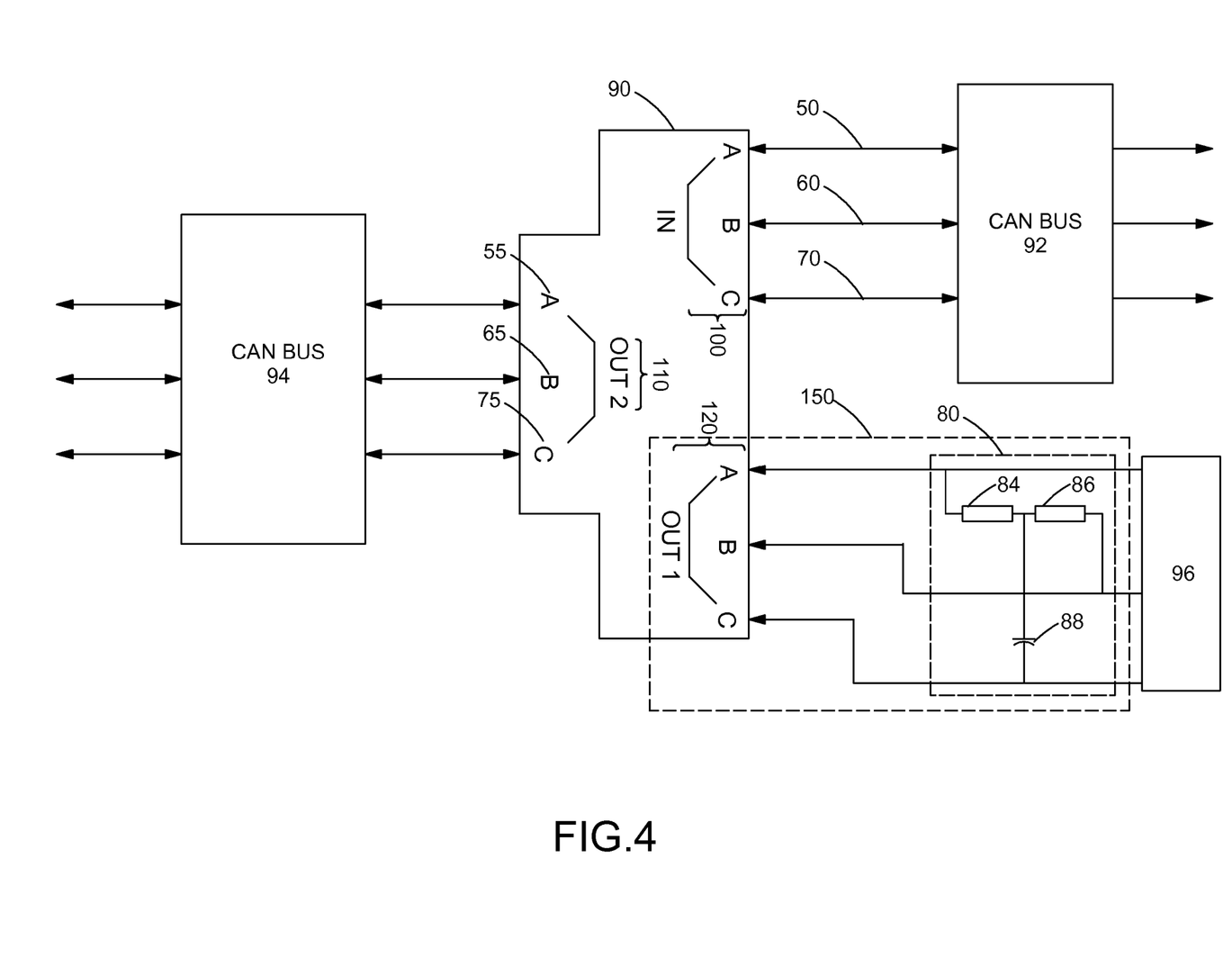
FIG. 4 is a schematic view of a CAN communication network used in a heavy machine engine environment having two CAN buses connected to one another via a splitter and an open connection of the splitter terminated by a termination circuit in accordance with the present disclosure.

Turning now to FIG. 4, an illustrated example of the disclosed termination circuit 80 is viewed as used within the communication environment of a heavy machine engine. In an embodiment of the present disclosure, the heavy machine engine can be a locomotive engine, a tractor trailer engine, or a commercial construction equipment engine or the like. In this heavy machine engine environment, a splitter 90 connects a first CAN bus 92 to a second CAN bus 94. The first CAN bus 92 has a CAN_H transmission line 50, a CAN_L transmission line 60 and a ground line 70 traveling out of the first CAN bus 92 and into the splitter 90. The first CAN bus 92 is connected to the splitter 90 at the input port 100 of the splitter 90. The splitter 90 has an input port 100 and also two output ports 110 and 120 so that devices connected to the splitter 90 can be in communication with one another. The input and output ports of the splitter 100, 110 and 120 each have three pin connections a piece for connection to remote electrical devices or CAN buses. Pin A 55 of these pin connections connects to the CAN_H transmission line 50. Pin B 65 of these pin connections connects to the CAN_L transmission line 60. Additionally, Pin C 75 of these pin connections connects to a ground line 70. While the first CAN bus 92 is connected to the input port 100 of the splitter 90, the second CAN bus 94 is connected to the second output port 110 of the splitter 90. Like the first CAN bus 92, the second CAN bus 94 has a CAN_H transmission line 50 connected to the splitter 90, a CAN_L transmission line 60 connected to the splitter 90, and a ground line 70 connected to the splitter 90. Through these connections, the first CAN bus 92 is in communication with the second CAN bus 94 and vice versa. Although FIG. 4, illustrates only a first CAN bus 92 and a second CAN bus 94 connected to one another via a splitter 90, it is understood that the multiple CAN buses needed for proper operation of a heavy machine engine can be configured in this fashion so that the multiple electronic control units of the engine can be connected to one another and in communication with one another.

As viewed in FIG. 4, because the first CAN bus 92 is connected to the input port 100 of the splitter 90 and the second CAN bus 94 is connected to the second output port 110 of the splitter 90, the first output port 120 is open. Since the first output port 120 of the splitter 90 is not connected to another electronic device in the illustrated network of FIG. 4, the electronic signals flowing out of the first output port 120 of the splitter 90 must be properly terminated before connecting to the worker help station 96. To properly terminate these signals, a termination connector 150 is connected to the first output port 120 of the splitter 90. The termination connector 150 has three transmission lines 50, 60 and 70 connected to the first output port 120 of the splitter 90. A CAN_H transmission line 50 is connected to the first output port 120 as well as a termination circuit 80 within the termination connector 150. A CAN_L transmission line 60 is also connected to the first output port 120 as well as the termination circuit 80 within the termination connector 150. Finally, a ground line 70 is connected to the first output port 120 as well as the termination circuit 80 within the termination connector 150.

The termination circuit 80 within the termination connector 150 connects to each of these three transmission lines 50, 60 and 70. As illustrated in FIG. 4, an embodiment of the disclosure shows the termination circuit 80 being two resistors 84 and 86 connected to one another in electric series. Additionally, a capacitor 88 is connected between the two resistors 84 and 86 of the termination circuit 80. As shown in FIG. 4, the CAN_H transmission line 50 is connected to one end of the two resistors 84 and 86 in electric series. The CAN_L transmission line 60 is connect to the opposite end of the two resistors 84 and 86 in electric series. The capacitor 88 is connected between the two resistors 84 and 86 of the termination circuit 80. The opposite end of the capacitor 88 is connected to the ground line 70.

In an embodiment of the present disclosure, the CAN communication network seen in FIG. 4 uses three pins 55, 65, and 75 for communication throughout the network. As stated earlier, this three pin 55, 65, and 75 configuration is proper for use of the SAE J1939-11 communication protocol. To connect to the splitter 90 as seen in FIG. 4, the termination circuit 80 is housed in the termination connector 150.

Figure 5:
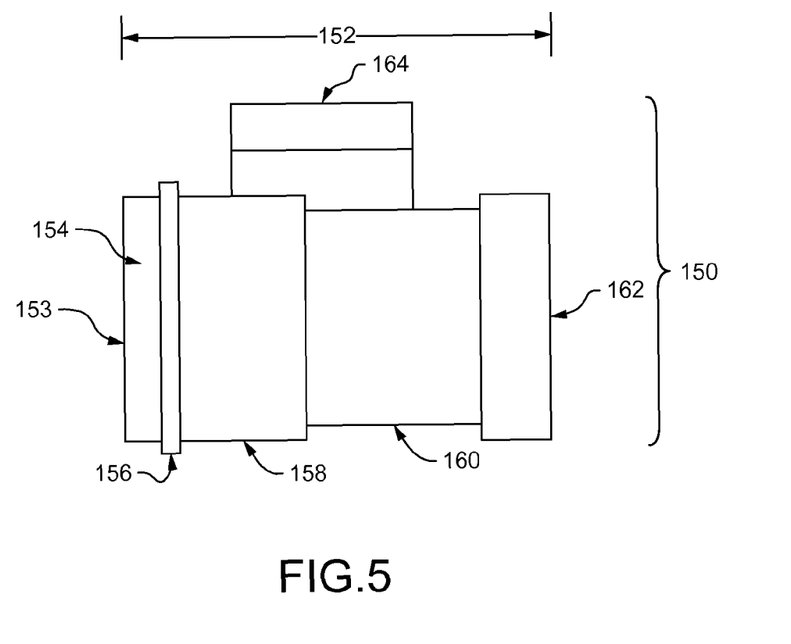
FIG. 5 is a side view of a CAN termination connector housing a termination circuit for use in a heavy machine engine environment in accordance with the present disclosure.

FIG. 5, as illustrated, gives a side view of the termination connector 150 used for network termination in a CAN communication network communicating through SAE J1939-11 protocol. Although not readily apparent from the side view, the termination connector 150 in the disclosed embodiment is a triangular shape, but other shapes may be used for the termination connector 150. The termination connector 150 is made from plastic material. The length 152 of the termination connector 150 from the front housing end 153 to the back housing end 162 is 1.18 inches in an embodiment of the present disclosure, however the length 152 can vary to fit the necessary spatial requirements of the system the termination connector 150 is attached too. The front housing end 153 of the termination connector 150 has a wedgelock portion 154 attached to the front housing end 153 which can mate with a receptacle configured to fit the termination connector 150. A possible receptacle can be the splitter 90 as seen in FIG. 4 or the like. The wedgelock portion 154 has a triangle shaped key configured on it so that the wedgelock portion 154 is securely connected to the receptacle when the termination connector 150 is placed inside the receptacle. To stop the wedgelock portion 154 from sliding too far into the receptacle, a raised seal 156 is located slightly after the wedgelock portion 154 of the termination connector 150. The seal 156 surrounds the plug housing portion 158 of the termination connector 150 and is attached to the termination connector 150. The seal 156 in an embodiment of the present disclosure is made of rubber material. When the wedgelock portion 154 is placed into a receptacle, the seal 156 is in contact with the sides of the receptacle. The seal 156 prevents foreign material or liquids from entering the termination connector 150 and causing the termination connector 150 to malfunction.

Following the seal 156 a plug housing portion 158 is part of the termination connector 150. The plug housing portion 158 contains the connection pin receptacles. In an embodiment of the present disclose, the pin configuration has three connection pin receptacles to receive the connection pins from outside receptacles such as the splitter 90. Following the plug housing portion 158, the termination circuit housing portion 160 is part of the termination connector 150. The termination circuit housing portion 160 contains the termination circuit 80 inside. The termination circuit 80 is attached to the ends of the connection pin receptacles contained in the plug housing portion 158. The back housing end 162 of the termination connector is open. Although the back housing end 162 is open, it is not exposed to the outside environment. The back housing end 162 of the termination connector 150 is potted with epoxy to fill the interior of the termination connector 150. By filling the back housing end 162 of the termination connector 150 with epoxy the components of the termination circuit 80 and held in place along with their connections to the connection pin receptacles. Filling the back housing end 162 with epoxy also prevents the introduction of foreign material or liquids into the interior of the termination connector 150 which may cause the enclosed termination circuit 80 to malfunction.

Additionally, a raised lock 164 is located in the middle of the termination connector 150 and on top of the termination connector 150 protruding from part of the plug housing portion 158 and part of the termination circuit housing portion 160. The raised lock 164 has a rectangular shape being three rectangles, with space between them. The middle rectangle is raised above the two outer rectangles in this configuration. When the termination connector 150 mates with a receptacle, the receptacle lock connects to the raised lock 164 securing the termination connector 150 in place so that the termination connector 150 will not become dislodged when the heavy machine engine is in operation. Additionally the raised lock 164 requires the termination connector 150 to be placed in the receptacle in a proper pin orientation so that the electronic signals are correctly aligned and therefore properly terminated.

Figure 6:
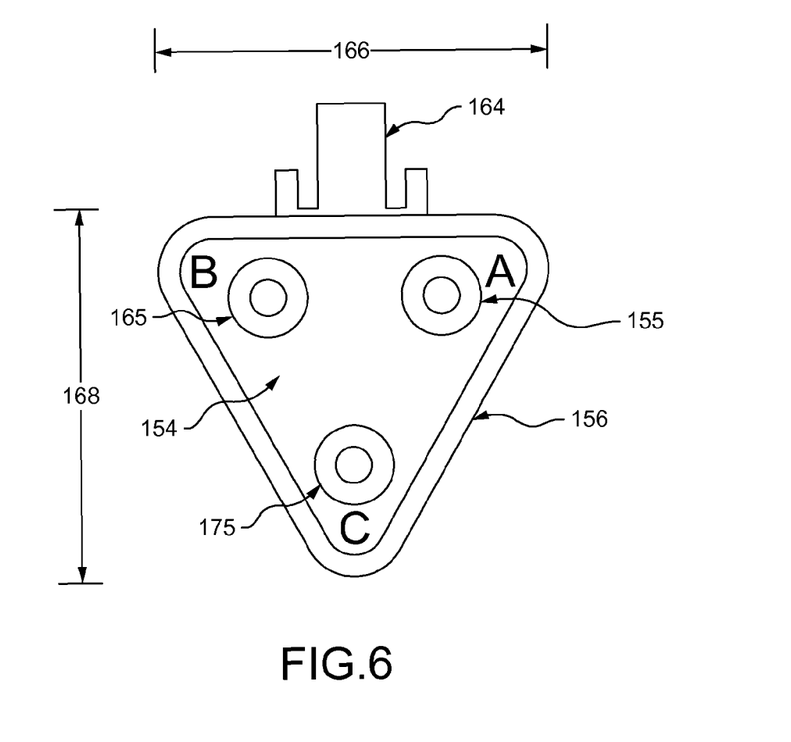
FIG. 6 is a front view of a CAN termination connector housing a termination circuit for use in a heavy machine engine environment in accordance with the present disclosure.

Turning to FIG. 6, an illustrated view of the front housing end 153 of the termination connector 150 is shown. The multiple rectangular configuration of the raised lock 164 is shown above the wedgelock portion 154 of the termination connector 150. Also the seal 156 surrounding the plug housing portion 158 is shown as a slightly larger triangular shape than the wedgelock portion 154. The width 166 of the termination connector 150 is 0.80 inches, although the width 166 can vary to meet the spatial requirements of the receptacle and heavy engine environment. The height 168 of the termination connector 150 is 0.97 inches, although the height 168 can vary to meet the spatial requirements of the receptacle and heavy engine environment. The termination connector 150 has a three pin receptacle orientation with each pin receptacle adjacent to one of the edges of the termination connector's triangular shape. The Pin B receptacle 165 is located toward the upper left edge of the termination connector 150. The Pin A receptacle 155 is located toward the upper right edge of the termination connector 150. The Pin C receptacle 175 is located toward the bottom edge of the termination connector 150. Each of the pin receptacles of the termination connector 155, 165 and 175 has the same circumference and size. The pins receptacles 155, 165 and 175 are configured to fit a contact size 16. Additionally the pin receptacles 155, 165 and 175 are configured for a current rating of 13.

Figure 7:
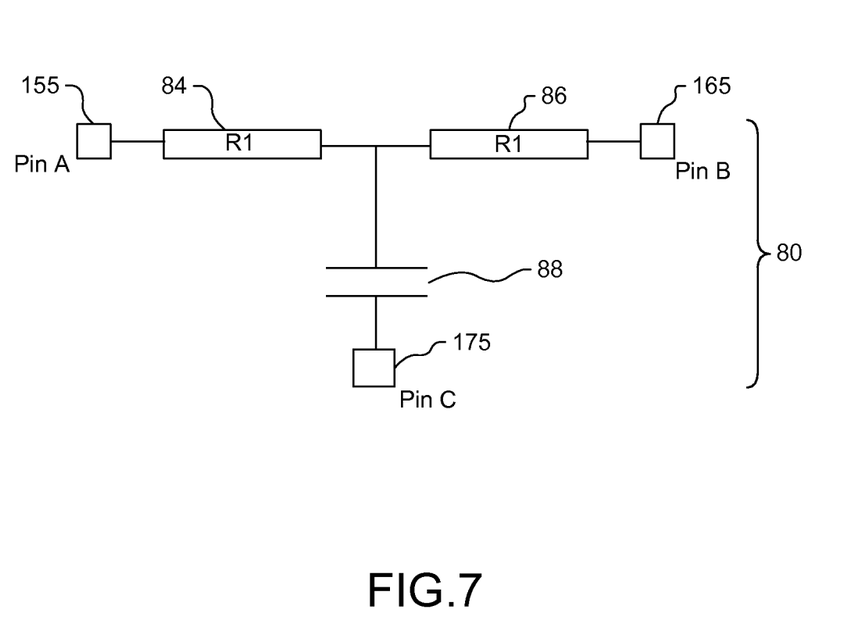
FIG. 7 is a schematic view of a termination circuit in accordance with the present disclosure which is housed in a CAN termination connector for use in a heavy machine engine environment.

The termination circuit 80 housed in the termination connector 150 is viewed in FIG. 7. Two resistors 84 and 86 are connected in series between the Pin A receptacle 155 and the Pin B receptacle 165. The Pin A receptacle 155 receives a CAN_H signal from for CAN communication network. The Pin B receptacle 165 receives a CAN_L signal from the CAN communication network. The first resistor 84 in an embodiment of the present disclosure has a resistance of 61.9 Ohms. The second resistor 86 in an embodiment of the present disclosure has a resistance of 61.9 Ohms. Connected between the first and the second resistors 84 and 86 is a capacitor 88. The capacitor 88 is also connected to the Pin C receptacle 175. The Pin C receptacle 175 is a grounding connection. The capacitor 88 can have a value in the range of 1 n Farad to 100 n Farads so that the electronic signal feedback is properly removed. In an embodiment of the present disclosure the capacitor 88 has a capacitance of 4.7 n Farads.

Figure 8:
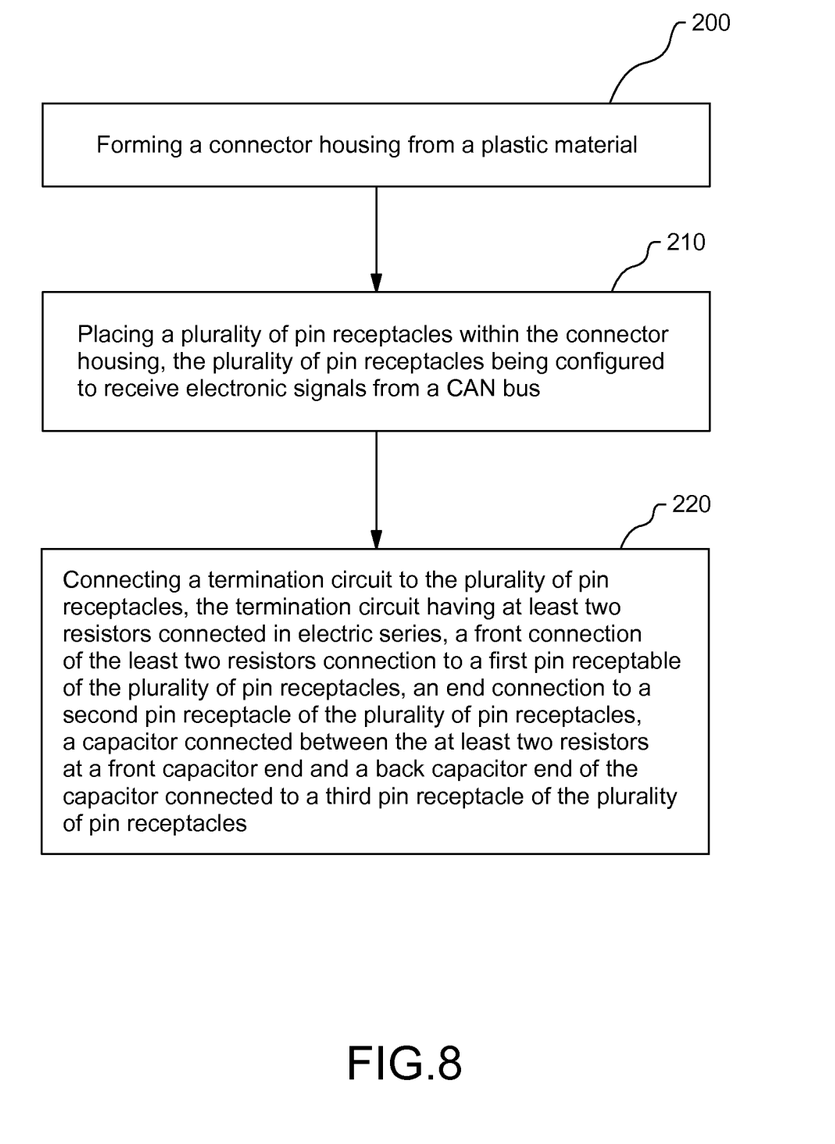
FIG. 8 is a flowchart that exemplifies one method of making the CAN termination connector in accordance with the present disclosure.

As illustrated by FIG. 8, a flow chart is viewed showing a method of manufacturing the disclosed termination connector 150. First, in block 200, the connector housing of the termination connector 150 is formed from plastic material. The connector housing includes the above disclosed components of the termination connector 150 including a front housing end 153, a plug housing portion 158, a termination circuit housing portion 160, a back housing end 162, and a raised lock 164. Additionally, a wedgelock portion 154 may be placed over the front housing end 153 of the termination connector 150 and a seal 156 may be attached surrounding the plug housing portion 158 located after the wedgelock portion 154 of the termination connector 150. Moreover, the back housing end 162 of the termination connector 150 may be potted with an epoxy. Next, in block 210, a plurality of pin receptacles are placed into the connector housing. This plurality of pin receptacles is configured to receive electronic signals from a CAN bus or a CAN communication network. Within the connector housing, the plurality of pin receptacles is contained within the plug housing portion 158 of the termination connector 150. Next, in block 220, a termination circuit 80 is connected to the plurality of pin receptacles inside the termination connector 150. The termination circuit 80 has two resistors 84 and 86 connected in electric series to one another. The first pin receptacle 155 of the plurality of pin receptacles and the second pin receptacle 165 of the plurality of pin receptacles are connected to opposite ends of the two resistors 84 and 86 connected in electric series. A capacitor 88 is connected between the two resistors 84 and 86 at a front capacitor end and the back capacitor end is connected to a third pin receptacle 175 of the plurality of pin receptacles.

It will be appreciated that in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come with the scope of the following claims and equivalents thereof.

INDUSTRIAL APPLICABILITY

From the foregoing, it may be appreciated that the CAN termination connector disclosed herein may have industrial applicability in a variety of setting such as, but not limited to, use in a heavy machine engine environment. Such CAN termination connectors may also be used, for example in automotive engines, trucking engines, locomotive and rail engines, tractor engines, earth moving machine engines, mining equipment engines, or construction machine engines or the like.

Additionally in the field of heavy machine engine use, such a CAN termination connector allows for proper termination of high speed CAN communication network protocols. Such a CAN termination connector allows for increased filtration of electronic signal reflection back into the CAN communication network or system of which the CAN termination connector is attached. Additional filtration and minimal electronic signal reflection allows the CAN communication network in which such a CAN termination connector is attached to operate with better efficiency and with proper communication because of the reduced feedback and noise reflected back into the CAN communication network or system.

While the foregoing detailed description has addressed only specific embodiments, it is to be understood that the scope of the disclosure is not intended to be limiting. Thus, the breadth and spirit of this disclosure is intended to be broader than any of the embodiments specifically disclosed and/or encompassed within the claims appended hereto.

What is claimed is:

1. A termination connector for use in heavy machine engines, the termination connector comprising:
    a connector housing;
    a plurality of pin receptacles contained within the connector housing and configured to receive electronic signals from a communication module; and
    a termination circuit connected to the plurality of pin receptacles, the termination circuit having at least two resistors connected in electric series, a front connection of the at least two resistors connected to a first pin receptacle of the plurality of pin receptacles, an end connection of the at least two resistors connected to a second pin receptacle of the plurality of pin receptacles, a capacitor connected between the at least two resistors at a front capacitor end, and a back capacitor end connected to a third pin receptacle of the plurality of pin receptacles.

2. The termination connector of claim 1, wherein a cumulative resistance of the at least two resistors in series is sufficient to terminate the received electronic signals from the communication module.

3. The termination connector of claim 1, wherein the communication module is a controller area network bus.

4. The termination connector of claim 3, wherein the electronic signals from the controller area network bus operate under a SAE-J1939 communications protocol.

5. The termination connector of claim 1, wherein the at least two resistors connected in series is a first resistor and a second resistor of equal resistance.

6. The termination connector of claim 5, wherein the capacitor has a capacitance value between a range of 1 n Farad to 100 n Farads.

7. The termination connector of claim 1, wherein the connector housing is formed from plastic material and has a front housing end, a plug housing portion, a termination circuit housing portion, a back housing end, and a raised lock portion protruding from a top portion of the connector housing, the top portion of the connector housing being part of a top portion of the plug housing portion and part of a top portion of the termination circuit housing portion.

8. The termination connector of claim 7, wherein the plug housing portion contains the plurality of pin receptacles, the termination circuit housing portion contains the termination circuit, and the back housing end is potted with an epoxy.

9. The termination connector of claim 8, wherein a seal is affixed to the outside of the connector housing between the front housing end and the plug housing portion and a wedgelock portion is affixed to the front housing end of the connector housing.

10. A communication network for use in heavy machine engines, the communication network comprising:
    a plurality of communication modules, the plurality of communication modules operable to send and receive electronic signals between one another;
    a splitting component operable to connect the plurality of communication modules to one another, the splitting component having an input port and at least two output ports;
    a first communication module of the plurality of communication modules connected to the input port of the splitting component and a second communication module of the plurality of communication modules connected to a first output port of the at least two output ports of the splitting component; and
    a termination connector connected to a second output port of the at least two output ports of the splitting component and operable to terminate the electronic signal received by the termination connector, the termination connector comprising:
a connector housing;
a plurality of pin receptacles contained within the connector housing and configured to receive the electronic signals from the communication network; and
a termination circuit connected to the plurality of pin receptacles, the termination circuit having at least two resistors connected in electric series, a front connection of the at least two resistors connected to a first pin receptacle of the plurality of pin receptacles, an end connection of the at least two resistors connected to a second pin receptacle of the plurality of pin receptacles, a capacitor connected between the at least two resistors at a front capacitor end, and a back capacitor end connected to a third pin receptacle of the plurality of pin receptacles.

11. The communication network of claim 10, wherein a cumulative resistance of the at least two resistors in series is sufficient to terminate the received electronic signals from the communication network.

12. The communication network of claim 10, wherein the heavy machine engine in which the communication network is used is a locomotive engine.

13. The communication network of claim 10, wherein the plurality of communication modules is a plurality of controller area network buses.

14. The communication network of claim 13, wherein the electronic signals from the plurality of controller area network buses operate under a SAE-J1939 communications protocol.

15. The communication network of claim 10, wherein the at least two resistors connected in series is a first resistor and a second resistor of equal resistance.

16. The communication network of claim 15, wherein the capacitor has a capacitance value between a range of 1 n Farad to 100 n Farads.

17. The communication network of claim 10, wherein the termination connector the connector housing is formed from plastic material and has a front housing end, a plug housing portion, a termination circuit housing portion, a back housing end, and a raised lock portion protruding from a top portion of the connector housing, the top portion of the connector housing being part of a top portion of the plug housing portion and part of a top portion of the termination circuit housing portion.

18. The communication network of claim 17, wherein the termination connector the plug housing portion contains the plurality of pin receptacles, the termination circuit housing portion contain the termination circuit, and the back housing end is potted with an epoxy.

19. The communication network of claim 18, wherein the termination connector a seal is affixed to the outside of the connector housing between the front housing end and the plug housing portion and a wedgelock portion is affixed to the front housing end of the connector housing.

20. A method of manufacturing a termination connector for use in heavy machine engines, the method comprising the steps of:
forming a connector housing from a plastic material;
placing a plurality of pin receptacles within the connector housing, the plurality of pin receptacles being configured to receive electronic signals from a communication module; and
connecting a termination circuit to the plurality of pin receptacles, the termination circuit having at least two resistors connected in electric series, a front connection of the at least two resistors connected to a first pin receptacle of the plurality of pin receptacles, an end connection of the at least two resistors connected to a second pin receptacle of the plurality of pin receptacles, a capacitor connected between the at least two resistors at a front capacitor end and a back capacitor end of the capacitor connected to a third pin receptacle of the plurality of pin receptacles.

* * * * *